(12) United States Patent
Chae et al.

(10) Patent No.: US 8,504,003 B2
(45) Date of Patent: Aug. 6, 2013

(54) MOBILE TERMINAL INCLUDING A PLURALITY OF USER IDENTIFICATION MODULE AND SERVER CONTROLLING OPERATION OF THE MOBILE TERMINAL

(75) Inventors: Byungkee Chae, Seoul (KR); Eunjin Kim, Seoul (KR); Junhee Kim, Seoul (KR); Kyungjin Moon, Seoul (KR)

(73) Assignee: LG Electronics Inc., Seoul (KR)

( * ) Notice: Subject to any disclaimer, the term of this patent is extended or adjusted under 35 U.S.C. 154(b) by 133 days.

(21) Appl. No.: 13/097,815

(22) Filed: Apr. 29, 2011

(65) Prior Publication Data

US 2012/0164999 A1  Jun. 28, 2012

(30) Foreign Application Priority Data

Dec. 23, 2010  (KR) .................. 10-2010-0133189

(51) Int. Cl.
*H04W 88/02* (2009.01)
(52) U.S. Cl.
USPC ............................ 455/418; 455/558; 455/415

(58) Field of Classification Search
USPC ......................................... 455/418, 558, 415
See application file for complete search history.

(56) References Cited

U.S. PATENT DOCUMENTS

2008/0064443 A1* 3/2008 Shin et al. .................... 455/558
2011/0028135 A1* 2/2011 Srinivasan .................... 455/415

* cited by examiner

*Primary Examiner* — David Q Nguyen
(74) *Attorney, Agent, or Firm* — KED & Associates, LLP

(57) ABSTRACT

Provided is a mobile terminal including a plurality of user identification modules. The mobile terminal includes a first user identification module configured to be assigned with a first identification number and receive a service from a first service network, a second user identification module configured to be assigned with a second identification number and receive a service from a second service network, and a controller configured to request the second service network to perform a predetermined service using the second identification number when a user requests the predetermined service using the first identification number and when the first user identification module is in an inactive state and the second user identification module is in an active state.

10 Claims, 15 Drawing Sheets

MOBILE TERMINAL INCLUDING A PLURALITY OF USER IDENTIFICATION MODULE AND SERVER CONTROLLING OPERATION OF THE MOBILE TERMINAL

This application claims the benefit of Korean Patent Application No 10-2010-0133189 filed on Dec. 23, 2010 which are hereby incorporated by reference.

BACKGROUND

1. Field

This documents relates to a mobile terminal including a plurality of user-identification modules and a server for controlling the operation of the mobile terminal.

2. Related Art

Functions of a terminal, such as a personal computer, a laptop computer, a portable phone, and/or a smart phone, have been diversified. Such a terminal has been manufactured in the form of a multimedia player that allows the user to capture images or moving images, reproduce a moving image, play games, and receive a broadcasting signal.

In order to support the various functions of a terminal, many efforts have been made to improve the hardware and/or software structures of the terminal. Furthermore, a menu structure of the terminal has been complicated to support various functions of a terminal. Lately, a mobile terminal for using a plurality of telephone numbers using a plurality of user-identification modules has received attention.

SUMMARY

According to an embodiment of the present invention, when a mobile terminal uses an identification number of an activated user identification module, an opposing mobile terminal displays an identification number of an inactivated user identification module on a display unit. Accordingly, a user of the mobile terminal can prevent the identification number of the activated user identification module from being revealed to a user of the opposing mobile terminal.

According to an embodiment of the present invention, a user of a mobile terminal can receive a communication service through a service network having a proper communication state among a plurality of service networks corresponding to a plurality of user identification modules included in the mobile terminal.

According to an embodiment of the present invention, when a mobile terminal uses an identification number of an activated user identification module, a server controls an opposing mobile terminal to display an identification number of an inactivated user identification module on a display unit. Accordingly, a user of the mobile terminal can prevent the identification number of the activated user identification module from being revealed to a user of the opposing mobile terminal.

In accordance with an embodiment of the present invention, a mobile terminal includes first and second user identification modules, and a controller. The first user identification module is configured to be assigned with a first identification number and receive a service from a first service network. The second user identification module is configured to be assigned with a second identification number and receive a service from a second service network. The controller is configured to request the second service network to perform a predetermined service using the second identification number when a user requests the predetermined service using the first identification number and when the first user identification module is in an inactive state and the second user identification module is in an active state.

The controller may transmit information to an opposing terminal to display that the service is requested to the first service network using the first identification number although the service is actually requested to the second service network using the second identification module.

In accordance with another embodiment of the present invention, a mobile terminal includes a first user identification module configured to be assigned with a first identification number and to receive a service from a first service network, a second user identification module configured to be assigned with a second identification number and to receive a service from a second service network, a communication unit configured to provide a communication service using one of the first user identification module and the second user identification module, and a controller configured to switch a service network providing the communication service from the first service network to the second service network based on a communication state of the first service network.

In accordance with still another embodiment of the present invention, a server comprises a communication unit configured to receive a service request that is requested using a first identification number corresponding to a first user identification module included in a mobile terminal, and a controller configured to provide the requested service using a second identification number corresponding to a second user identification module included in the mobile terminal when the first user identification module is in an inactive state and the second user identification module is in an active state.

The controller may transmit information to a mobile terminal that requests the service to show that the service is provided using the first identification number although the service is actually provided using the second identification number.

BRIEF DESCRIPTION OF THE DRAWINGS

The accompany drawings, which are included to provide a further understanding of this document and are incorporated on and constitute a part of this specification illustrate embodiments of this document and together with the description serve to explain the principles of this document.

DETAILED DESCRIPTION

The present invention will now be described more fully with reference to the accompanying drawings, in which exemplary embodiments of the invention are shown. The invention may, however, be embodied in many different forms and should not be construed as being limited to the embodiments set forth herein; rather, there embodiments are provided so that this disclosure will be thorough and complete, and will fully convey the concept of the invention to those skilled in the art.

Hereinafter, a mobile terminal relating to the present invention will be described below in more detail with reference to the accompanying drawings. In the following description, suffixes "module" and "unit" are given to components of the mobile terminal in consideration of only facilitation of description and do not have meanings or functions discriminated from each other.

The mobile terminal described in the specification can include a cellular phone, a smart phone, a laptop computer, a digital broadcasting terminal, personal digital assistants (PDA), a portable multimedia player (PMP), a navigation system and so on.

Figure 1:
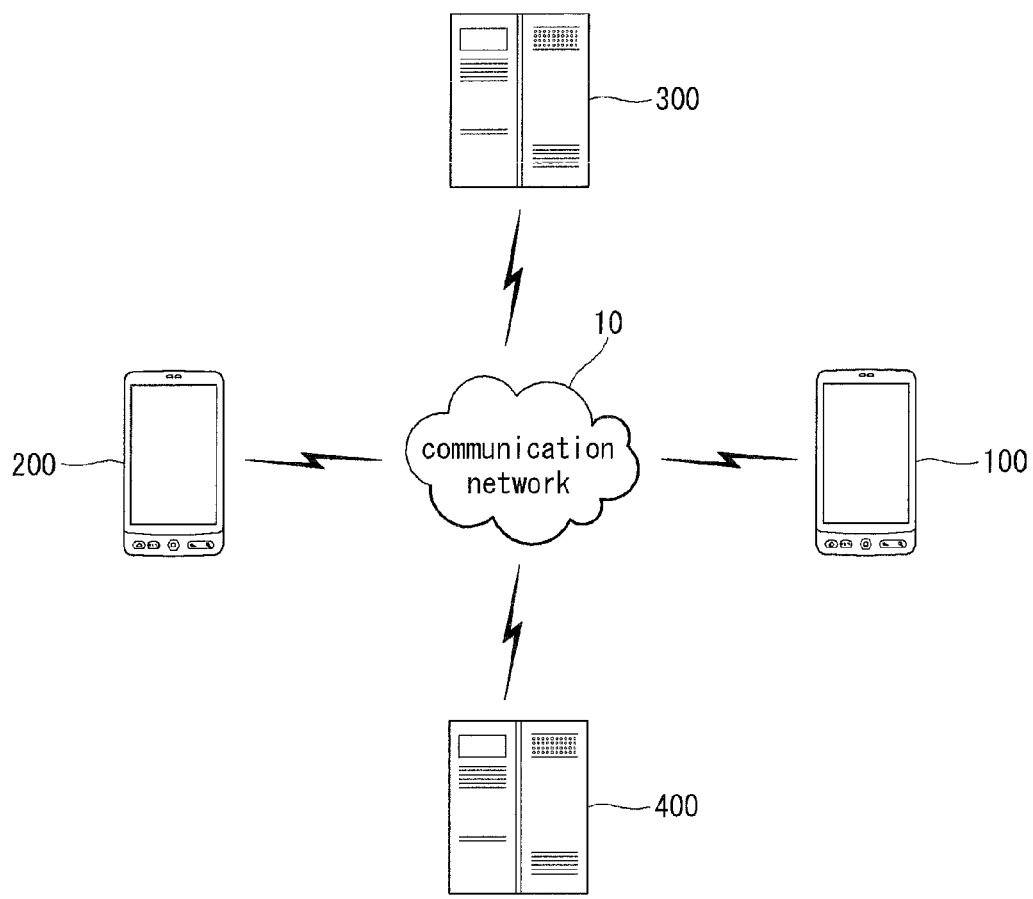
FIG. 1 is a diagram illustrating a communication system according to an embodiment of the present invention.

FIG. 1 is a diagram illustrating a communication system according to an embodiment of the present invention. Referring to FIG. 1, the communication system includes first and second mobile terminals 100 and 200 and servers 300 and 400.

The first mobile terminal 100 may be a mobile terminal according to an embodiment of the present invention. The mobile terminal 100 may include a plurality of user-identification modules. Here, the user-identification module is a chip that stores various types of information, such as the user's identity information, in order to verify a use right of the mobile terminal 100. Such a user-identification module is included in a subscriber identity module (SIM) card for a Global System for Mobile communication (GSM). The user-identification module may be included in a universal subscriber identity module (USIM) card for a Universal Mobile Telecommunication System (UMTS). Furthermore, the user-identification module may be included in a User Identity Module (UIM) card or a Removal User Identity Module (RUIM) card for a Code Division Multiple Access (CDMA) system.

A user of the mobile terminal 100 requests a service to a corresponding service network using an identification number of a preferred user-identification module among the plurality of user-identification modules. For example, the identification number may be a telephone number assigned by a service network to a corresponding user-identification module. The service may include a call transmitting service, a message transmitting service, and a data transmitting/receiving service. When the preferred user-identification module is in an inactive state, the mobile terminal 100 can request service from another service network using an identification number of activated one among the plurality of user-identification modules.

An "active state" of a user-identification module means a state that obtains a use right of the user-identification module by accessing a corresponding service network of the user-identification module. An "inactive state" of a user-identification module means a state in which a mobile terminal does not obtain a user right of the user-identification module from a corresponding service network. Furthermore, an inactive state of a user-identification module may mean that a corresponding mobile terminal does not include the user-identification module.

While the mobile terminal 100 is receiving a communication service through a service network of a predetermined user-identification module, the mobile terminal 100 may change the service network to a different service network. That is, when a communication state of the service network of the predetermined user-identification module becomes improper, the mobile terminal 100 changes the service network to another service network having a proper communication state. For example, the mobile terminal 100 changes the service network to a distinct service network when a received signal strength indication (RSSI) of a signal is dropped below a predetermined level. The other service network, having a proper communication state, may be a service network corresponding to the other user-identification module. As described above, the communication service may include a call transmitting/receiving service, a message transmitting/receiving service, and/or a data transmitting/receiving service.

Throughout the specification, a call may include a voice call and/or a video call, and a message may include a short message service (SMS) message, a multimedia messaging service (MMS) message, and/or an email. Furthermore, data may be transmitted and/or received not only through a wired network but also through a wireless network such as a mobile communication network, and/or a wireless internet network. However, the present invention is not limited thereto.

The server 300 may be a server according to an embodiment of the present invention. When a second mobile terminal 200 requests the server 300 to perform a communication service related to a user-identification module of the first mobile terminal 100, the server 300 determines whether the user-identification module of the first mobile terminal 100 is activated or not by communicating with the mobile terminal 100.

That is, when the user identification mobile of the first mobile terminal 100 is in an inactive state, the server 300 may perform the requested service through a service network of another activated user-identification module in the first mobile terminal 100. That is, the server 300 may use an identification number of the activated user-identification module to perform the requested service from the second mobile terminal 200. The server 300 may cooperate with the server 400 to perform the process of switching the user identification number.

Figure 2:
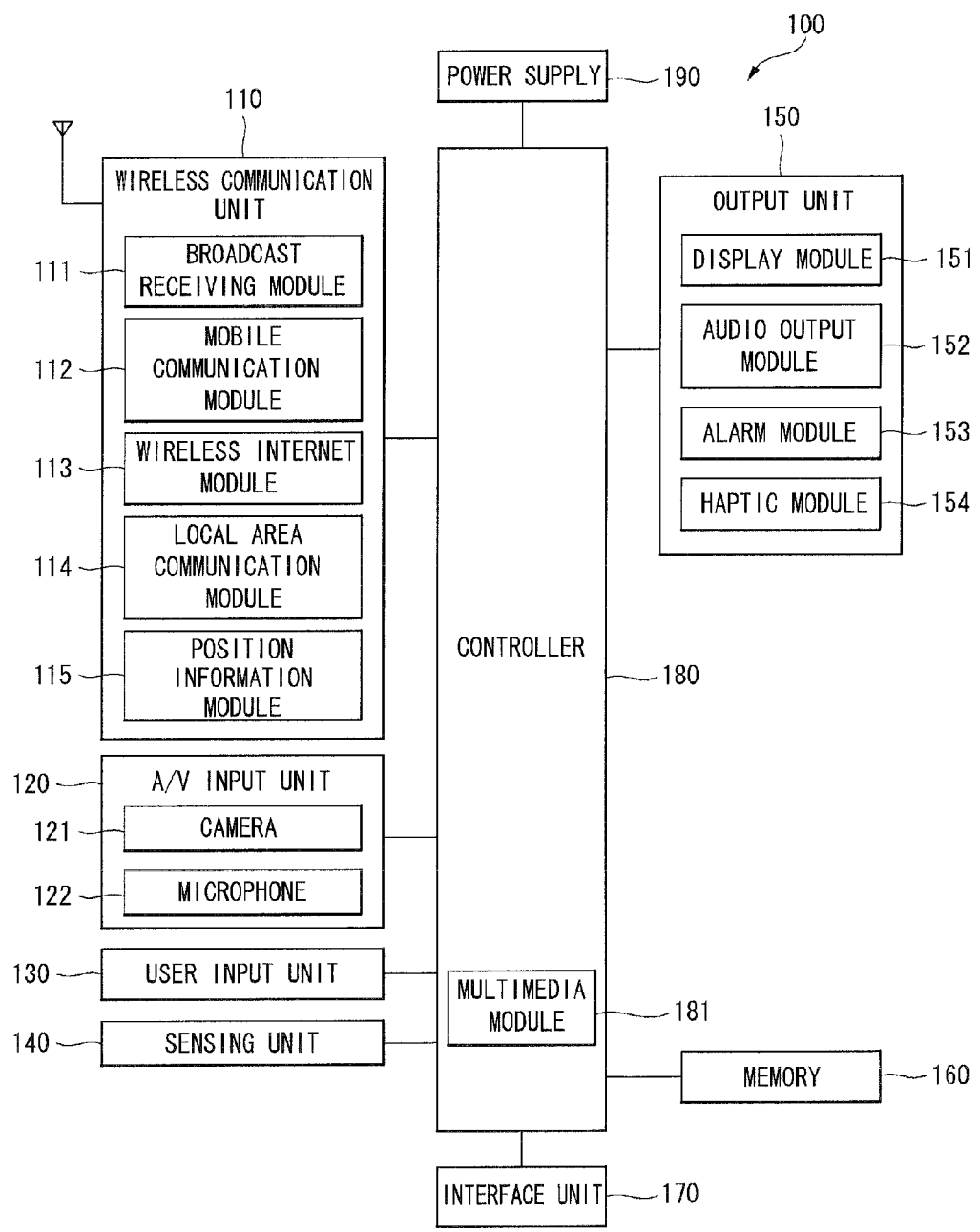
FIG. 2 is a block diagram that illustrates a mobile terminal according to an embodiment of the present invention.

FIG. 2 is a block diagram that illustrates a mobile terminal according to an embodiment of the present invention. The mobile terminal 100 can include a wireless communication unit 110, an audio/video (A/V) input unit 120, a user input unit 130, a sensing unit 140, an output unit 150, a memory 160, an interface unit 170, a controller 180, and a power supply unit 190. The components shown in FIG. 2 are not essential parts and the number of components included in the mobile terminal can be varied.

The components of the mobile terminal will now be described.

The wireless communication unit 110 can include at least one module that enables radio communication between the mobile terminal 100 and a radio communication system or between the mobile terminal 100 and a network in which the mobile terminal 100 is located. For example, the wireless communication unit 110 can include a broadcasting receiving module 111, a mobile communication module 112, a wireless Internet module 113, a local area communication module 114 and a position information module 115.

The broadcasting receiving module 111 receives broadcasting signals and/or broadcasting related information from an external broadcasting management server through a broadcasting channel.

The broadcasting channel can include a satellite channel and a terrestrial channel. The broadcasting management server can be a server that generates and transmits broadcasting signals and/or broadcasting related information or a server that receives previously created broadcasting signals and/or broadcasting related information and transmits the broadcasting signals and/or broadcasting related information to a terminal. The broadcasting signals can include not only TV broadcasting signals, radio broadcasting signals and data broadcasting signals but also signals in the form of combination of a TV broadcasting signal and a radio broadcasting signal.

The broadcasting related information can be information on a broadcasting channel, a broadcasting program or a broadcasting service provider. The broadcasting related information can be provided even through a mobile communication network. In this case, the broadcasting related information can be received by the mobile communication module 112.

The broadcasting related information can exist in various forms. For example, the broadcasting related information can exist in the form of electronic program guide (EPG) of digital multimedia broadcasting (DMB) or in the form of electronic service guide (ESG) of digital video broadcast-handheld (DVB-H).

The broadcasting receiving module 111 receives broadcasting signals using various broadcasting systems. Particularly, the broadcasting receiving module 111 can receive digital broadcasting signals using digital broadcasting systems such as digital multimedia broadcasting-terrestrial (DMB-T), digital multimedia broadcasting-satellite (DMB-S), media forward link only (MediaFLO), DVB-H and integrated services digital broadcast-terrestrial (ISDB-T) systems. The broadcasting receiving module 111 can be constructed to be suited to broadcasting systems providing broadcasting signals other than the above-described digital broadcasting systems.

The broadcasting signals and/or broadcasting related information received through the broadcasting receiving module 111 can be stored in the memory 160. The mobile communication module 112 transmits/receives a radio signal to/from at least one of a base station, an external terminal and a server on a mobile communication network. The radio signal can include a voice call signal, a video telephony call signal or data in various forms according to transmission and receiving of text/multimedia messages.

The wireless Internet module 113 means a module for wireless Internet access and can be included in the mobile terminal 100 or externally attached to the mobile terminal 100. Wireless LAN (WLAN) (Wi-Fi), wireless broadband (Wibro), world interoperability for microwave access (Wimax), high speed downlink packet access (HSDPA) and so on can be used as a wireless Internet technique.

The local area communication module 114 means a module for local area communication. Bluetooth, radio frequency identification (RFID), infrared data association (IrDA), ultra wideband (UWB) and ZigBee can be used as a local area communication technique.

The position information module 115 confirms or obtains the position of the mobile terminal. A global positioning system (GPS) module is a representative example of the position information module 115. According to the current technology, the GPS module 115 can calculate information on distances between one point (object) and at least three satellites and information on the time when the distance information is measured and apply trigonometry to the obtained distance information to obtain three-dimensional position information on the point (object) according to latitude, longitude and altitude at a predetermined time.

Furthermore, a method of calculating position and time information using three satellites and correcting the calculated position and time information using another satellite is also used. In addition, the GPS module 115 continuously calculates the current position in real time and calculates velocity information using the position information.

Referring to FIG. 2, the A/V input unit 120 is used to input an audio signal or a video signal and can include a camera 121 and a microphone 122. The camera 121 processes image frames of still images or moving images obtained by an image sensor in a video telephony mode or a photographing mode. The processed image frames can be displayed on a display module 151.

The image frames processed by the camera 121 can be stored in the memory 160 or transmitted to an external device through the wireless communication unit 110. The mobile terminal 100 can include at least two cameras according to constitution of the terminal.

The microphone 122 receives an external audio signal in a call mode, a recording mode or a speed recognition mode and processes the received audio signal into electric audio data. The audio data can be converted into a form that can be transmitted to a mobile communication base station through the mobile communication module 112 and output in the call mode. The microphone 122 can employ various noise removal algorithms for removing noise generated when the external audio signal is received.

The user input unit 130 receives input data for controlling the operation of the terminal from a user. The user input unit 130 can include a keypad, a dome switch, a touch pad (constant voltage/capacitance), jog wheel, jog switch and so on.

The sensing unit 140 senses the current state of the mobile terminal 100, such as open/close state of the mobile terminal 100, the position of the mobile terminal 100, whether a user touches the mobile terminal 100, the direction of the mobile terminal 100 and acceleration/deceleration of the mobile terminal 100 and generates a sensing signal for controlling the operation of the mobile terminal 100. For example, the sensing unit 140 can sense whether a slide phone is opened or closed when the mobile terminal 100 is the slide phone. Furthermore, the sensing unit 140 can sense whether the power supply unit 190 supplies power and whether the interface unit 170 is connected to an external device. The sensing unit 140 can include a proximity sensor.

The output unit 150 generates visual, auditory or tactile output and can include the display module 151, an audio output module 152, an alarm module 153 and a haptic module 154.

The display module 151 displays information processed by the mobile terminal 100. For example, the display module 151 displays UI or graphic user interface (GUI) related to a telephone call when the mobile terminal is in the call mode. The display module 151 displays a captured or/and received image, UI or GUI when the mobile terminal 100 is in the video telephony mode or the photographing mode.

The display module 151 can include at least one of a liquid crystal display, a thin film transistor liquid crystal display, an organic light-emitting diode display, a flexible display and a three-dimensional display.

Some of these displays can be of a transparent type or a light transmission type. This can be referred to as a transparent display. The transparent display includes a transparent liquid crystal display. The rear structure of the display module 151 can also be of the light transmission type. According to this structure, a user can see an object located behind the body of the mobile terminal 100 through an area of the body of the mobile terminal 100, which is occupied by the display module 151.

The mobile terminal 100 can include at least two display modules 151 according to constitution of the terminal. For example, the mobile terminal 100 can include a plurality of displays that are arranged on a single face at a predetermined distance or integrated. Otherwise, the plurality of displays can be arranged on different sides.

In the case where the display module 151 and a sensor sensing touch (referred to as a touch sensor hereinafter) form a layered structure, which is referred to as a touch screen hereinafter, the display module 151 can be used as an input device in addition to an output device. The touch sensor can be in the form of a touch film, a touch sheet and a touch pad, for example.

The touch sensor can be constructed such that it converts a variation in pressure applied to a specific portion of the display module 151 or a variation in capacitance generated at a specific portion of the display module 151 into an electric input signal. The touch sensor can be constructed such that it can sense pressure of touch as well as the position and area of touch.

When touch input is applied to the touch sensor, a signal corresponding to the touch input is transmitted to a touch controller. The touch controller processes the signal and transmits data corresponding to the processed signal to the controller 180. Accordingly, the controller 180 can detect a touched portion of the display 151.

Referring to FIG. 2, the proximity sensor 141 can be located in an internal region of the mobile terminal, surrounded by the touch screen, or near the touch screen. The proximity sensor senses an object approaching a predetermined sensing face or an object located near the proximity sensor using electromagnetic force or infrared rays without having mechanical contact. The proximity sensor has lifetime longer than that of a contact sensor and has wide application.

The proximity sensor includes a transmission type photo-electric sensor, a direct reflection type photo-electric sensor, a mirror reflection type photo-electric sensor, a high-frequency oscillating proximity sensor, a capacitive proximity sensor, a magnetic proximity sensor, an infrared proximity sensor, etc.

A capacitive touch screen is constructed such that proximity of a pointer is detected through a variation in an electric field according to the proximity of the pointer. In this case, the touch screen (touch sensor) can be classified as a proximity sensor.

For convenience of explanation, an action of approaching the pointer to the touch screen while the pointer it not being in contact with the touch screen such that location of the pointer on the touch screen is recognized is referred to as "proximity touch" and an action of bring the pointer into contact with the touch screen is referred to as "contact touch" in the following description. A proximity touch point of the pointer on the touch screen means a point of the touch screen to which the pointer corresponds perpendicularly to the touch screen when the pointer proximity-touches the touch screen.

The proximity sensor senses proximity touch and a proximity touch pattern (for example, a proximity touch distance, a proximity touch direction, a proximity touch velocity, a proximity touch time, a proximity touch position, a proximity touch moving state, etc.). Information corresponding to the sensed proximity touch action and proximity touch pattern can be displayed on the touch screen.

The audio output module 152 can output audio data received from the wireless communication unit 110 or stored in the memory 160 in a call signal receiving mode, a telephone call mode or a recording mode, a speech recognition mode and a broadcasting receiving mode. The audio output module 152 outputs audio signals related to functions (for example, a call signal incoming tone, a message incoming tone, etc.) performed in the mobile terminal 100. The audio output module 152 can include a receiver, a speaker, a buzzer, etc.

The alarm module 153 outputs a signal for indicating generation of an event of the mobile terminal 100. Examples of events generated in the mobile terminal include receiving of a call signal, receiving of a message, input of a key signal, input of touch, etc. The alarm module 153 can output signals in forms different from video signals or audio signals, for example, a signal for indicating generation of an event through vibration. The video signals or the audio signals can be also output through the display module 151 or the audio output module 152.

The haptic module 154 generates various haptic effects that the user can feel. A representative example of the haptic effects is vibration. The intensity and pattern of vibration generated by the haptic module 154 can be controlled. For example, different vibrations can be combined and output or sequentially output.

The haptic module 154 can generate a variety of haptic effects including an effect of stimulus according to arrangement of pins vertically moving for a contact skin face, an effect of stimulus according to jet force or sucking force of air through a jet hole or a sucking hole, an effect of stimulus rubbing the skin, an effect of stimulus according to contact of an electrode, an effect of stimulus using electrostatic force and an effect according to reproduction of cold and warmth using an element capable of absorbing or radiating heat in addition to vibrations.

The haptic module 154 can not only transmit haptic effects through direct contact but also allow the user to feel haptic effects through kinesthetic sense of his fingers or arms. The mobile terminal 100 can include at least two haptic modules 154 according to constitution of the mobile terminal.

The memory 160 can store a program for the operation of the controller 180 and temporarily store input/output data (for example, phone book, messages, still images, moving images, etc.). The memory 160 can store data about vibrations and sounds in various patterns, which are output from when a touch input is applied to the touch screen.

The memory 160 can include at least one of a flash memory, a hard disk type memory, a multimedia card micro type memory, a card type memory (for example, SD or XD memory), a random access memory (RAM), a static RAM (SRAM), a read-only memory (ROM), an electrically erasable programmable ROM (EEPROM), a programmable ROM (PROM) magnetic memory, a magnetic disk and an optical disk. The mobile terminal 100 can operate in relation to a web storage performing the storing function of the memory 160 on the Internet.

The interface unit 170 serves as a path to all external devices connected to the mobile terminal 100. The interface unit 170 receives data from the external devices or power and transmits the data or power to the internal components of the mobile terminal 100 or transmits data of the mobile terminal 100 to the external devices.

The interface unit 170 can include a wired/wireless headset port, an external charger port, a wired/wireless data port, a memory card port, a port for connecting a device having a user identification module, an audio I/O port, a video I/O port, an earphone port, etc., for example.

An identification module is a chip that stores information for authenticating the authority to use the mobile terminal 100 and can include a user identify module (UIM), a subscriber identify module (SIM) and a universal subscriber identify module (USIM). A device (referred to as an identification device hereinafter) including the identification module can be manufactured in the form of a smart card. Accordingly, the identification device can be connected to the mobile terminal 100 through a card slot included in the interface unit 170.

The interface unit 170 can serve as a path through which power from an external cradle is provided to the mobile terminal 100 when the mobile terminal 100 is connected to the external cradle or a path through which various command signals inputted by the user through the cradle to the mobile terminal 100. The various command signals or power input from the cradle can be used as a signal for confirming whether the mobile terminal 100 is correctly set in the cradle.

The controller 180 controls the overall operation of the mobile terminal. For example, the controller 180 performs control and processing for voice communication, data communication and video telephony. The controller 180 can include a multimedia module 181 for playing multimedia. The multimedia module 181 can be included in the controller 180 or separated from the controller 180.

The controller 180 can perform a pattern recognition process capable of recognizing handwriting input or picture-drawing input applied to the touch screen as characters or images.

The power supply unit 190 receives external power and internal power and provides power required for the operations of the components of the mobile terminal under the control of the controller 180.

Various embodiments of the inventive concept can be implemented in a computer or similar device readable recording medium using software, hardware or a combination thereof, for example.

According to hardware implementation, the embodiments of the inventive concept can be implemented using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electrical units for executing functions. In some cases, the embodiments can be implemented by the controller 180.

According to software implementation, embodiments such as procedures or functions can be implemented with a separate software module executing at least one function or operation. Software codes can be implemented according to a software application written in an appropriate software language. Furthermore, the software codes can be stored in the memory 160 and executed by the controller 180.

Figure 3:
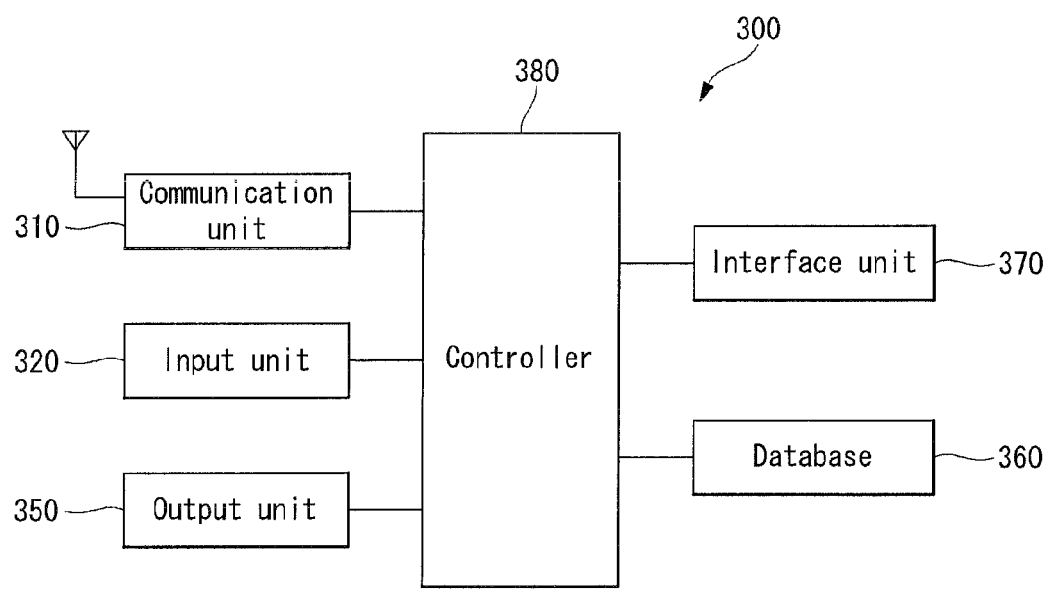
FIG. 3 is a block diagram that depicts a server 300 according to an embodiment of the present invention.

FIG. 3 is a block diagram that depicts a server 300 according to an embodiment of the present invention. Referring to FIG. 3, the server 300 includes a communication unit 310, an input unit 320, an output unit 350, a database 360, an interface unit 370, and a controller 380 similar to the mobile terminal 100 shown in FIG. 2. The components shown in FIG. 3 are not essential parts, and the number of components included in the server 300 can be varied.

Similar constituent elements of the server 300 shown in FIG. 3 and the mobile terminal 100 shown in FIG. 2 perform similar operations and have similar functions; operations and functions of the database 350 are similar to those of the memory 160. Therefore, the detailed descriptions thereof are omitted herein. The operations and functions of the constituent elements of the server 300 will be described in detail with reference to the following embodiments.

Previously, operations and functions of the first mobile terminal 100 and the server 300 according to the embodiment of the present invention were described in detail with reference to FIGS. 1 to 3. As described above, the mobile terminal 100 and the server 300 have features that selectively employ user-identification modules according to active/inactive states of user-identification modules and a communication state of a related service network. Hereinafter, such features of the mobile terminal 100 and the server 300 will be described in detail with reference to FIGS. 4 through 15.

Figure 4:
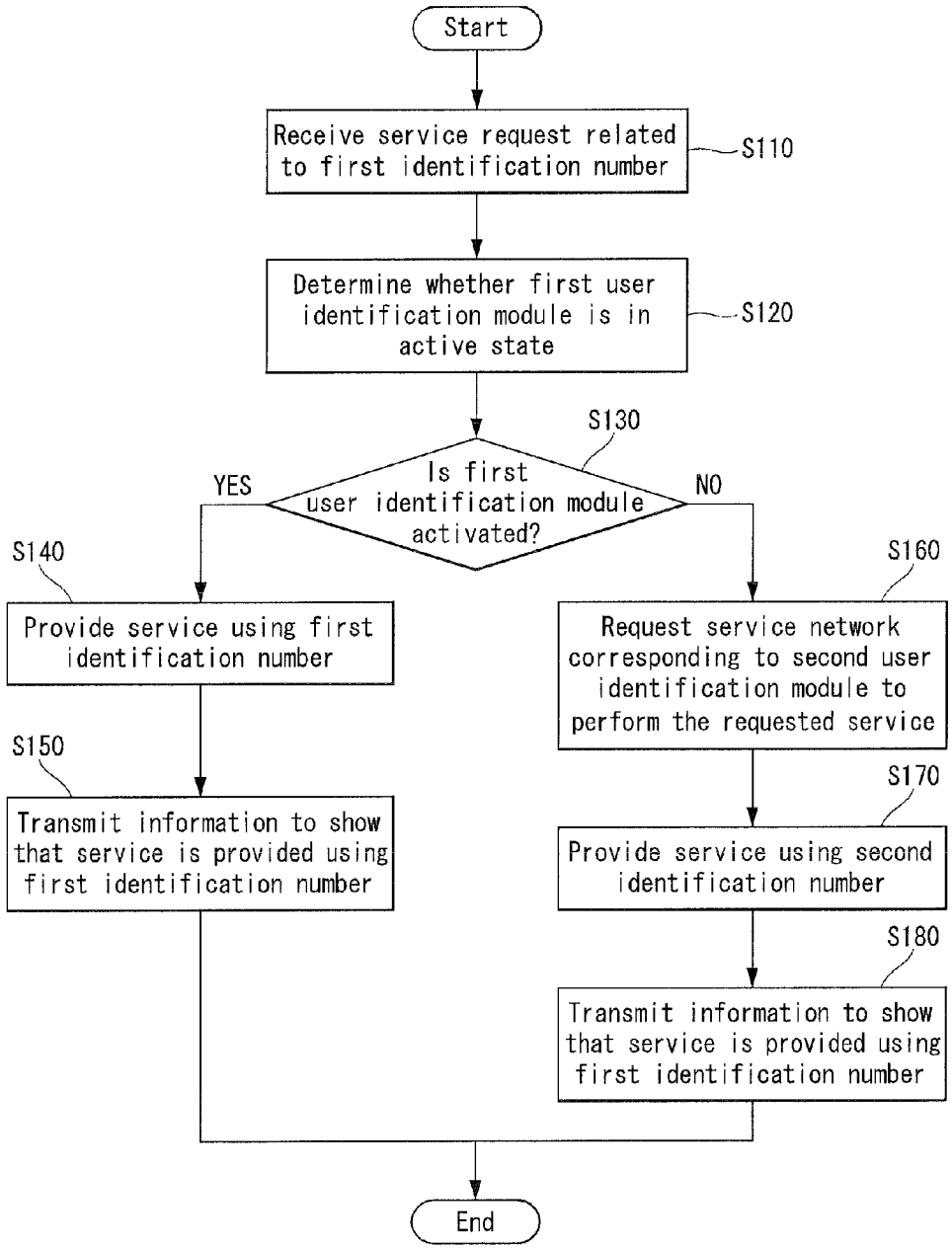
FIG. 4 is a flowchart that illustrates a method of a server for controlling a mobile terminal according to an embodiment of the present invention.

FIG. 4 is a flowchart that illustrates a method for controlling a mobile terminal according to an embodiment of the present invention. The method of FIG. 4 is performed by the server 300. In detail, FIG. 4 illustrates the controlling method of the server 300 when the second mobile terminal 200 requests the server 300 to perform a communication service related to one of a plurality of user-identification modules included in the mobile terminal 100. Hereinafter, the method for controlling a mobile terminal will be described with reference to FIGS. 1 to 4.

The mobile terminal 200 requests the server 300 to perform a communication service related to a first user-identification module in the mobile terminal 100. Here, the communication service may be a call transmitting service, a message transmitting service, or a data communication service. For example, the server 300 receives a service request related to a first identification number of the first user-identification module included in the mobile terminal 100 through the communication unit 310 of the server 300 at step S110.

At step S120, the controller 380 of the server 300 determines whether the first user-identification module is in an active state or not. If the server 300 is a server corresponding to the first identification module, the server 300 directly communicates with the first mobile terminal 100 to determine whether the first user-identification module is in an active state or not.

However, when the server 300 is not a server related to the first user-identification module, the server 300 queries a service network (for example, a server) related to the first user-identification module to determine whether the first user-identification module is in an active state or not. The server 300 can determine whether the first user-identification module is in the active state based on the response to the inquiry from the service network. Also, when the server 300 is not a server related to the second user-identification module, the server 300 queries a service network (for example, a server) related to the second user-identification module to determine whether the second user-identification module is in an active state or not. The server 300 can determine whether the second user-identification module is in the active state based on the response to the inquiry from the service network.

When the server 300 determines that the first user-identification module is in the active state at step S130, the controller 380 provides the requested service using the first identification number of the first user-identification module at step S140. At step S150, the server 300 transmits related information to the second mobile terminal 200 in order to inform a user that the requested service is provided using the first identification number.

When the server 300 is not a server related to an activated second user-identification module and when the first identification module is in the inactive state at step S130, the controller 380 requests a service network related to the activated second user-identification module to perform the requested service related to the first identification number at step S160. However, if the server 300 is a server related to the active second user-identification module, the server 300 does not need to request a different service network to perform the requested service.

When the service network of the second user-identification module accepts the service request, the requested service is provided using a second identification number at step S170. When the requested service is provided using the second identification number, the controller 380 transmits related information to the second mobile terminal 200 in order to display that the requested service is using the first identification number at step S180. Although the requested service is provided using the second identification number, the first identification number is displayed.

Then, the second mobile terminal 200 may output the received information as an audio signal and/or a video signal in order to inform a user that the requested service is provided using the first identification number although the requested service is provided using the second identification number.

That is, the second identification number of the activated second user-identification module is not revealed to a user of the second mobile terminal 200 according to the method for controlling a mobile terminal of FIG. 4. Accordingly, a user of the first mobile terminal 100 can prevent personal information (such as the second identification number) from being revealed to other users, while the user of the second mobile terminal 200 can receive the requested service despite requesting the service using the identification number of the inactive user-identification module.

Figure 5:
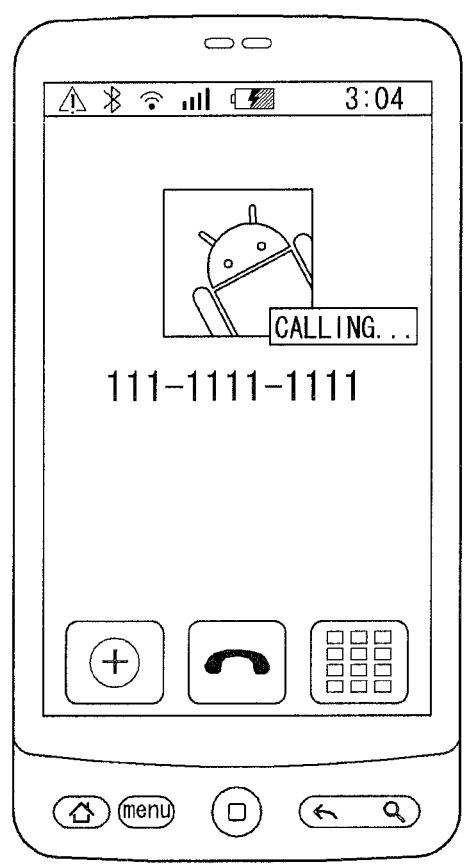
FIG. 5 illustrates an identification number displayed on the second mobile terminal 200 that transmits a call to the first mobile terminal 100 using the method for controlling a mobile terminal of FIG. 4.

FIG. 5 illustrates an identification number displayed on the second mobile terminal 200 that transmits a call to the first mobile terminal 100 using the method for controlling a mobile terminal of FIG. 4. As described above, the first mobile terminal 100 includes a plurality of user-identification modules. The second mobile terminal transmits a call using the first identification number related to the first user-identification module of the first mobile terminal 100. FIG. 5 shows an identification number displayed on the second mobile terminal 200.

In the specification, it is assumed that the first mobile terminal 100 receives a call from the second mobile terminal 200 and includes the first user-identification module and the second user-identification module. Also, it is assumed that an identification number of the first user-identification module is 111-1111-1111 and an identification number of the second user-identification module is 222-2222-2222. Furthermore, it is assumed that an identification number of the second mobile terminal 200 is 333-3333-3333.

As shown in FIG. 5, the second mobile terminal 200 displays the first identification number. The displayed identification number is unrelated to whether the first user-identification module is activated or not. It is because the second mobile terminal 200 displays the first identification number based on information transmitted from the server 300 although the second mobile terminal 200 transmits the call actually using the second identification number of the activated second user-identification module because the first user-identification module is in the inactive state.

Figure 6:
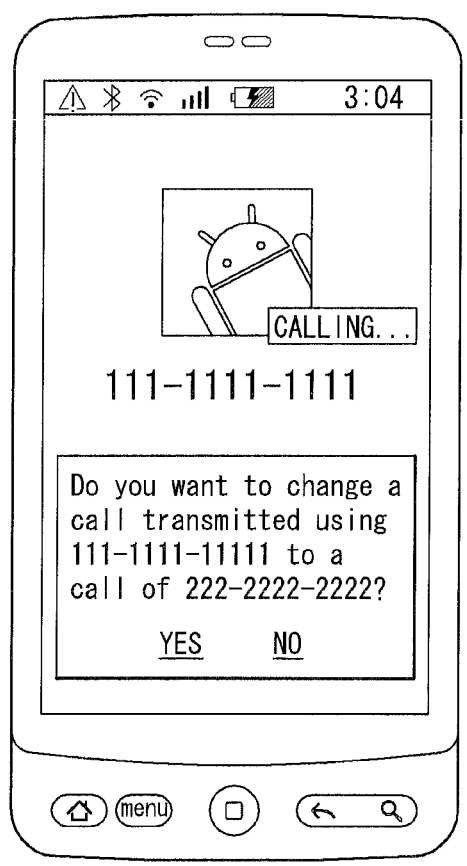
FIG. 6 illustrates a message widow displayed on the second mobile terminal 200 for inquiring a user of the second mobile terminal 200 to switch a call made using an identification number of an inactivated user-identification module to a call making using an identification number of an activated user-identification module.

FIG. 6 illustrates a message widow displayed on the second mobile terminal 200 for inquiring a user of the second mobile terminal 200 to switch a call made using an identification number of an inactivated user-identification module to a call making using an identification number of an activated user-identification module.

Referring to FIG. 6, when the server 300 receives a request of a call transmitting service using the first identification number of 111-1111-1111 from the second user mobile terminal 200 and when the first user-identification module of the first identification number is in the inactive state, the second mobile terminal 200 may display the message window for inquiring a user of the second mobile terminal 200 to divert the call transmitted using the first identification number 111-1111-1111 to a call transmitted using the second identification number 222-2222-2222 of the activated second identification module.

Then, the user of the second mobile terminal 200 may click a YES button in the displayed message window to divert the call transmitted using the first identification number 111-1111-1111 to the call transmitting using the second identification number 222-2222-2222. Also, the user may cancel the call by clicking a NO button. For example, the user may select the NO button when the user determines that a service charge of the call using the second identification number is more expensive than that of the call using the first identification number.

The message window of FIG. 6 may be displayed on the second mobile terminal 200 based on information that is transmitted from the server 300 to the second mobile terminal 200. The transmitted information is to inform the user of the second mobile terminal 200 that the call transmitted using the first identification number is provided through a service network related to the activated second user-identification module.

Because of the message window of FIG. 6, the second identification number of the first mobile terminal 100 is revealed to the user of the second mobile terminal 200. In this case, the user of the first mobile terminal 100 cannot prevent the personal information, such as the second identification number, from being revealed to the user of the second mobile terminal 200. However, the user of the second mobile terminal 200 could select one of identification numbers to be used to transmit a call.

Figure 7:
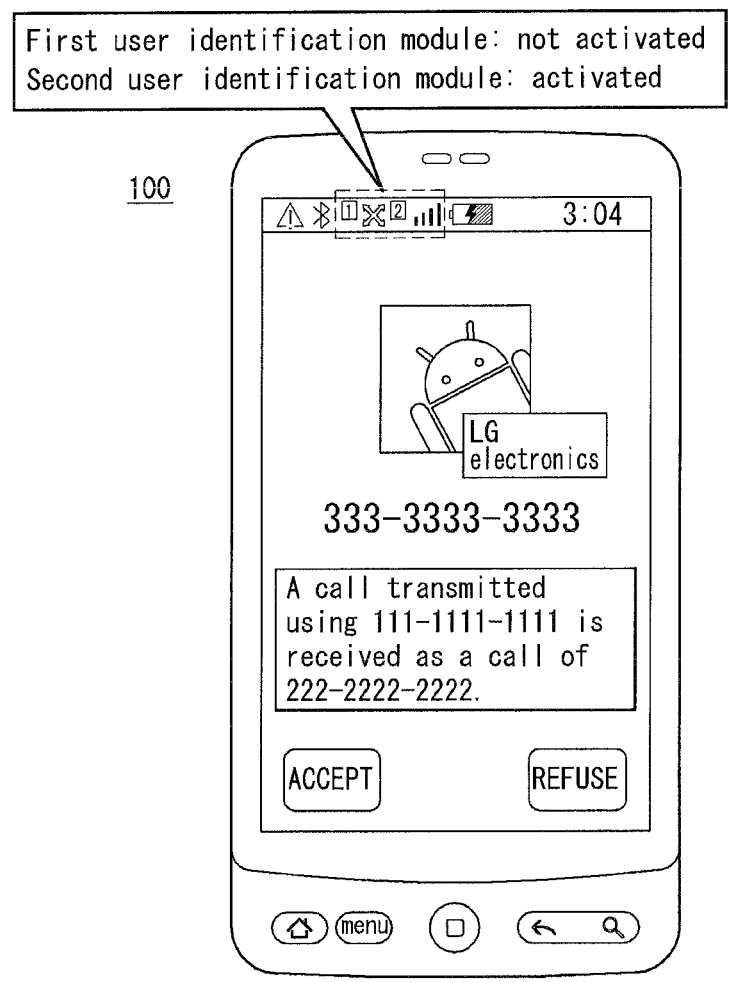
FIG. 7 illustrates a message window displayed on the first mobile terminal 100 according to the method of controlling a mobile terminal of FIG. 4.

FIG. 7 illustrates a message window displayed on the first mobile terminal 100 according to the method of controlling a mobile terminal of FIG. 4. As described above, it is assumed that the first mobile terminal 100 receives a call from the second mobile terminal 200. The message window of FIG. 7 shows a message that asks a user of the first mobile terminal 100 accept of a call transmitted from the second mobile terminal 200 using the second identification number of the activated second user-identification module of the first mobile terminal 100.

Figure 9:
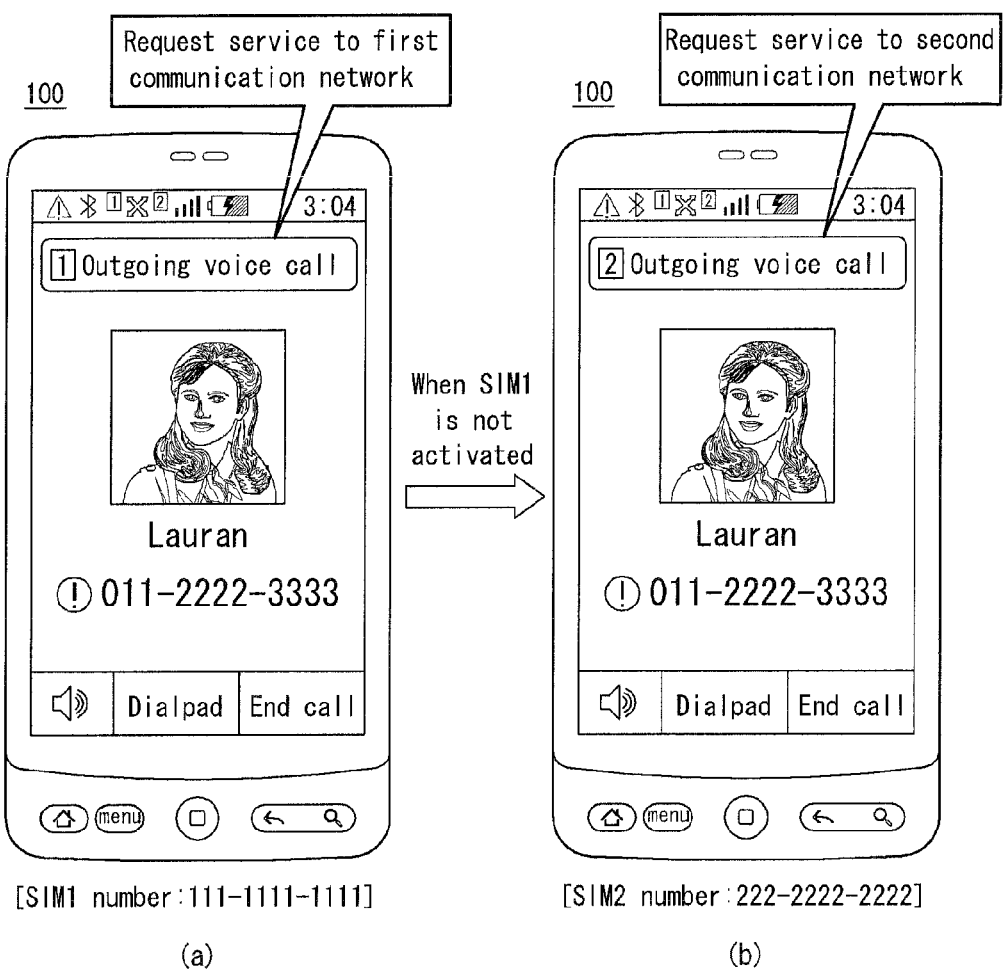
FIG. 9 illustrates a first mobile terminal 100 displaying that call-transmission is performed using an identification number of an activated user-identification module when the call-transmission is originally requested using an identification number of an not activated user-identification module according to the method of controlling a mobile terminal of FIG. 8.
Figure 10:
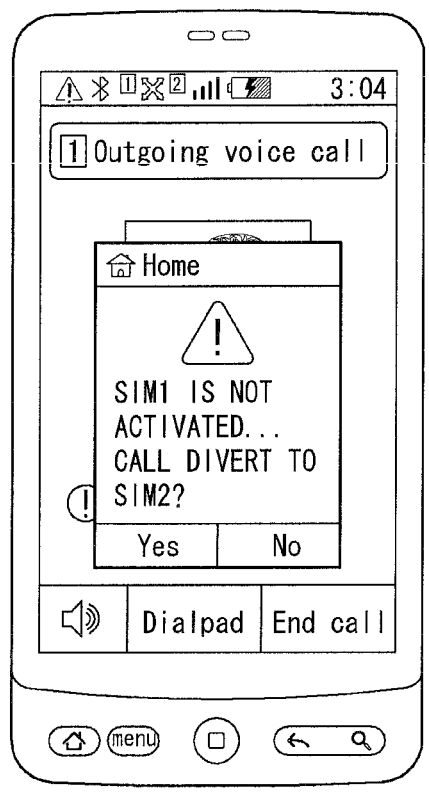
FIG. 10 illustrates a message window that requires a user to divert an identification number of a received call to an identification number of an activated user-identification module according to the method for controlling a mobile terminal of FIG. 8 when the call is transmitted using an identification number of an not activated user-identification module.

In FIG. 7, indicators surrounded by a dotted line show that the first mobile terminal 100 includes the first and second user-identification modules. The indicators also show that the first user-identification module is in an inactive state and the second user-identification module is in an active state. FIGS. 9 and 10 also illustrate the indicators with the same features.

As shown in FIG. 7, the first mobile terminal 100 displays an identification number 333-3333-3333 of the second mobile terminal 200. When the first user-identification module of the first mobile terminal 100 is not activated, the second mobile terminal 200 transmits a call using the second identification number 222-2222-2222 of the activated second user-identification module of the first mobile terminal 100 rather than the original transmission with the first identification number 111-1111-1111. In this case, the first mobile terminal 100 displays the message window to inquire the user of the first mobile terminal 100 to accept or deny the call transmitted from the second mobile terminal 200 using the second identification number 222-2222-2222 of the activated second user-identification module.

The user of the first mobile terminal 100 may click a ACCEPT button to accept the call transmitted from the second mobile terminal 200 using the second identification number 222-2222-2222 although the call was originally transmitted using the first identification number 111-1111-1111. Or the user of the first mobile terminal 100 may click a REFUSE button to refuse the call from the second mobile terminal 200.

The first mobile terminal 100 uses information transmitted from the server 300 to display the message window of FIG. 7. The information from the server 300 is to display that the call is transmitted from the second mobile terminal 200 using the second identification number 222-2222-22222 of the activated second user-identification module although the call is originally transmitted using the first identification number 111-1111-1111 of the inactivated first user identification number.

Figure 8:
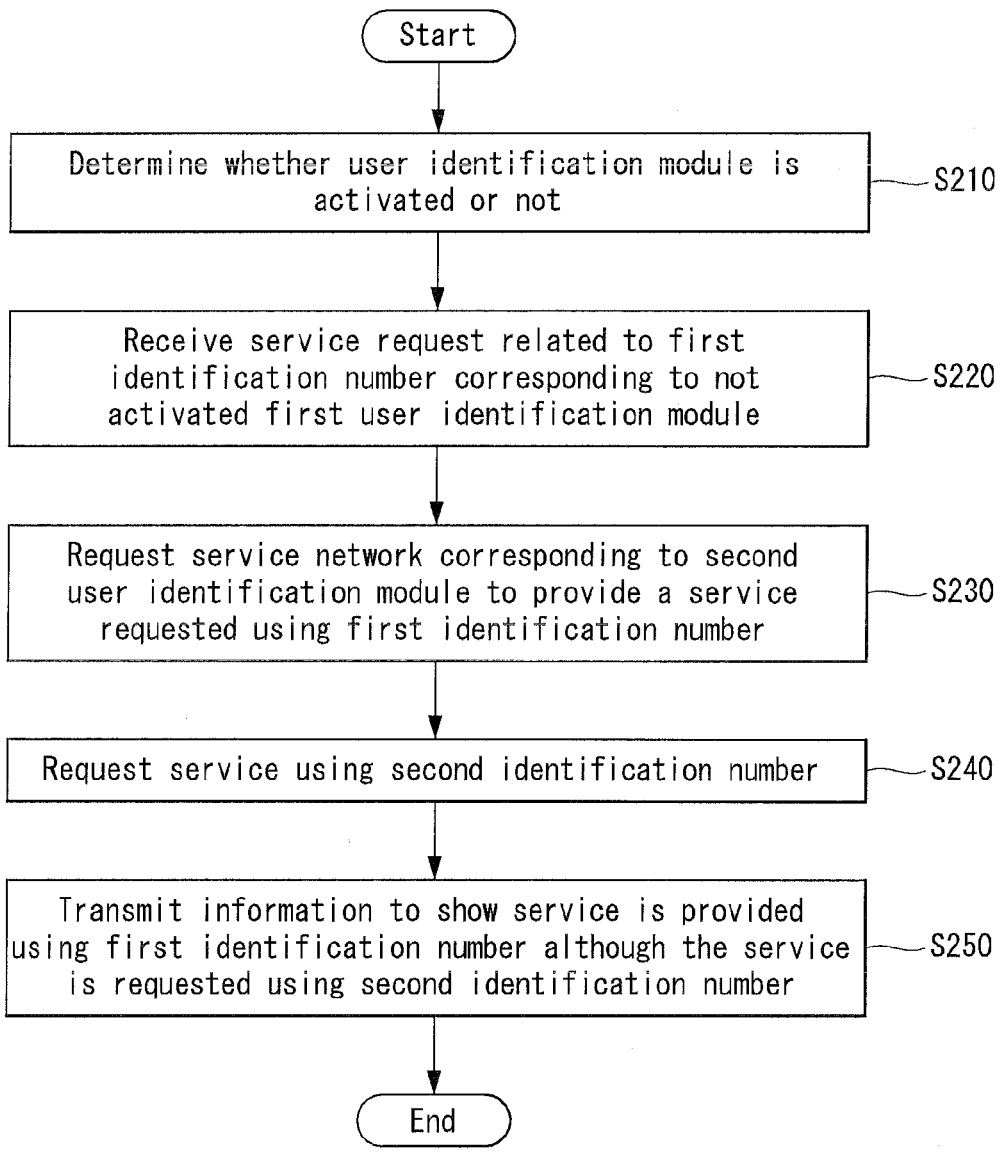
FIG. 8 is a flowchart that illustrates a method of a mobile terminal for controlling a mobile terminal according to an embodiment of the present invention.

FIG. 8 is a flowchart that illustrates a method for controlling a mobile terminal according to an embodiment of the present invention. The method of FIG. 8 is performed by the mobile terminal 100. The method for controlling a mobile terminal will be described in detail with reference to FIGS. 1 through 3 and FIG. 8.

At step S210, the controller 180 of the mobile terminal 100 determines whether or not a plurality of user identification modules in the mobile terminal 100 are activated. At step S220, the mobile terminal 100 receives a service request related to a first identification number of an inactivated first user identification number among the plurality of user identification modules included in the mobile terminal 100. For example, the controller 180 receives a call transmitting service request using the first identification number by the user of the mobile terminal 100. At step S230, the controller 180 requests a service network corresponding to an activated second user identification module to provide the requested service requested using the first identification number. In the step S230, the controller 180 uses an identification number corresponding to the second user identification module to request the service network to perform the requested service for the first identification number.

When the service network corresponding to the second user identification module accepts the request and the mobile terminal 100 receives a response from the service network, the controller 180 requests a service using the second identification number through the service network corresponding to the second user identification module at step S240. Then, the requested service may be provided through the service network corresponding to the second user identification module.

At step S250, the controller 380 transmits information to opposing mobile terminal of the requested service in order to display the service requested using the second identification number as the service requested using the first identification number.

Then, the first mobile terminal 100 may output an audio signal or a video signal to inform a user of the terminal 100 that the service is requested and performed with the first identification number although the service is requested using the second identification number.

According to the method for controlling a mobile terminal 100 of FIG. 8, the second identification number corresponding to the activated second user identification module is not revealed to other user. Therefore, the user of the mobile terminal 100 can prevent the personal information such as the second identification number from being revealed to other users.

FIG. 9 illustrates a first mobile terminal 100 displaying that call-transmission is performed using an identification number of an activated user-identification module when the call-transmission is originally requested using an identification number of an not activated user-identification module according to the method of controlling a mobile terminal of FIG. 8.

As described above, it is assumed that the first mobile terminal 100 transmits a call to the second mobile terminal 200. It is also assumed that the first mobile terminal 100 includes a first user-identification module and a second user-identification module, the first user-identification module is inactive, and the second user-identification module is active. When a user of the first mobile terminal 100 tries to transmit a call using the first identification number 111-1111-1111 of an not activated first user-identification module as shown in a diagram (a) of FIG. 9, the controller 180 of the mobile terminal 100 tries to transmit the call using the second identification number 222-2222-2222 of the activated second user identification number as shown in a diagram (b) of FIG. 9.

As shown in the diagram (b) of FIG. 9, the first mobile terminal 100 displays that call-transmission service to Lauran's telephone number 011-2222-3333 is requested through a service network corresponding to the second user-identification module. Although it is not shown in FIG. 9, the controller 180 may output an audio signal or a video signal to inform a user that a service network is changed to provide the call-transmission service. That is, the controller 180 may output information that a service originally requested using the first identification number is requested to a service network of the second user-identification module using the second identification number.

FIG. 10 illustrates a message window that asks a user whether or not to divert an identification number of a received call to an identification number of an activated user-identification module according to the method for controlling a mobile terminal of FIG. 8 when the call is transmitted using an identification number of an not activated user-identification module.

As described above, it is assumed that the mobile terminal 100 includes a first user-identification module and a second user-identification module. The first user-identification module is not activated, and the second user-identification module is activated. When a user tries to transmit a call using a first identification number 111-1111-1111 of an not activated first user-identification module, the controller 180 of the mobile terminal 100 may display a message window informing a user that the first user-identification module (SIM1) is not activated and asking the user whether or not the requested service is performed using the activated second user-identification module (SIM2).

Then, the user of the first mobile terminal 100 can divert the call transmitted using the not activated first user-identification module to a call using the activated second user-identification module by touching the YES button. Further, the user can deny diverting by clicking the NO button.

Figure 11:
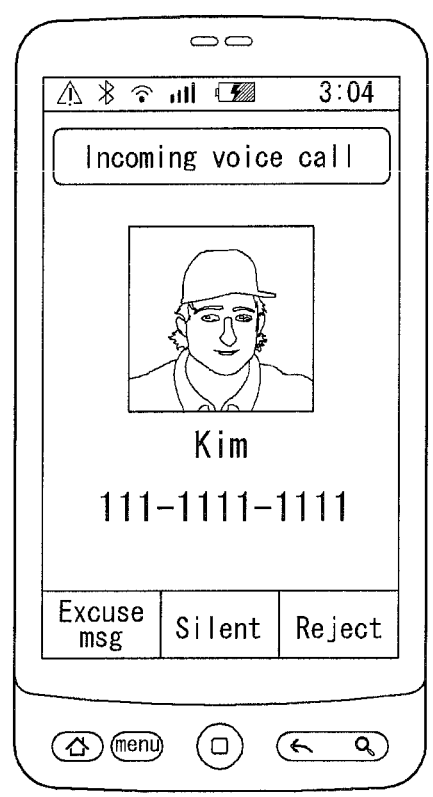
FIG. 11 shows an identification number displayed on a second mobile terminal 200 according to the method for controlling a mobile terminal of FIG. 8.

FIG. 11 shows an identification number displayed on a second mobile terminal 200 according to the method for controlling a mobile terminal of FIG. 8. Here, the second mobile terminal 200 receives a call from the first mobile terminal 100. The second mobile terminal 200 displays the first identification number 111-1111-1111 of the transmitting terminal 100 although the first mobile terminal 100 transmits the call using the second identification number of to the activated second user-identification module because the first user-identification module is not activated.

The first mobile terminal 200 uses information transmitted from the server 300 to display the first identification number. Therefore, the user of the mobile terminal 100 can prevent personal information such as the second identification number from being revealed to others.

Figure 12:
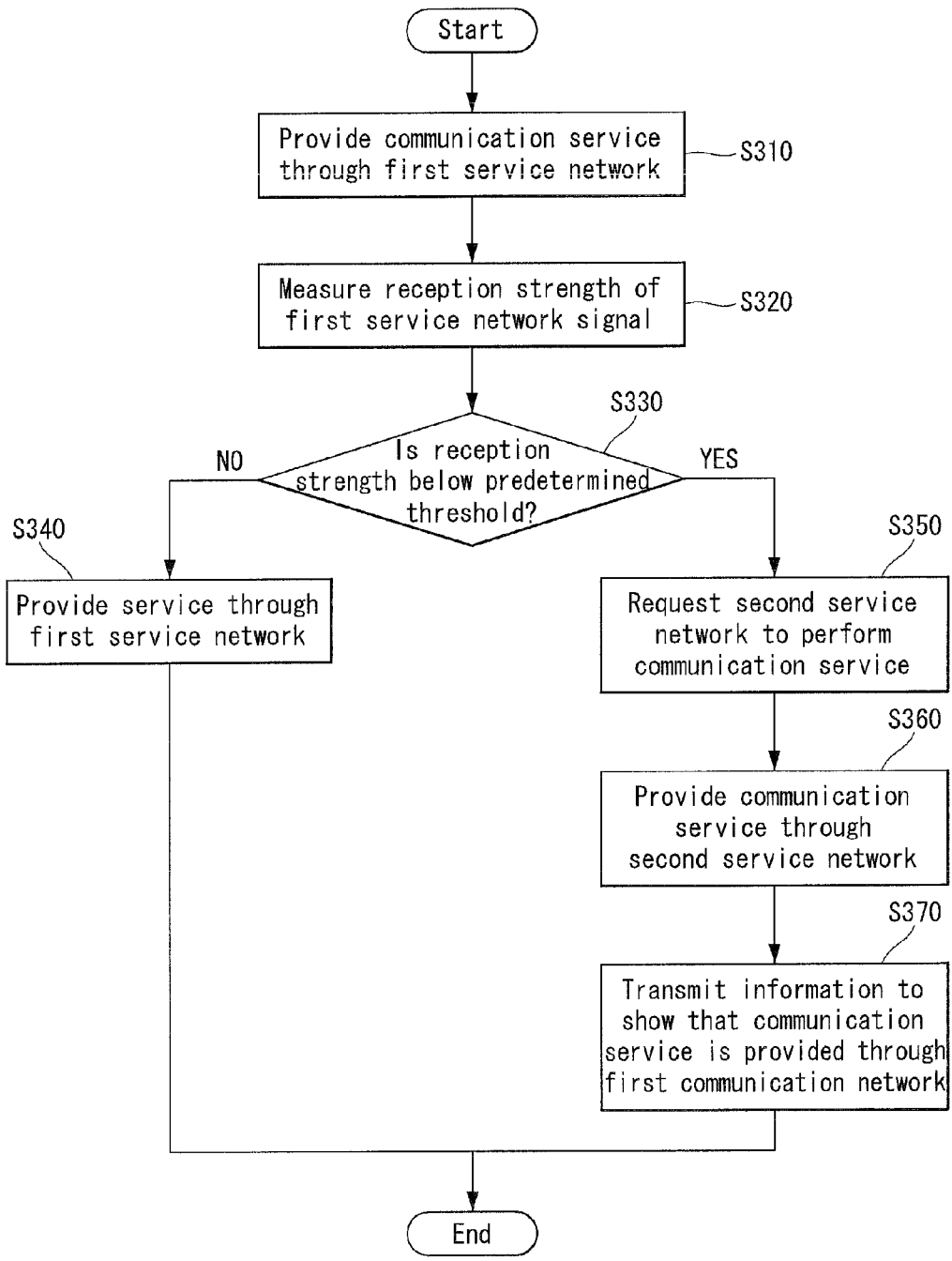
FIG. 12 is a flowchart that illustrates a method for controlling a mobile terminal according to another embodiment of the present invention.

FIG. 12 is a flowchart that illustrates a method for controlling a mobile terminal according to another embodiment of the present invention. The method of FIG. 12 is performed by a mobile terminal. Hereinafter, the method for controlling a mobile terminal will be described in detail with reference to FIGS. 1 to 3 and FIG. 12.

At step S310, the first mobile terminal 100 provides a service to a user through a first service network of the first user-identification module. The service may include a call transmitting/receiving service, a message transmitting/receiving service, and/or a data transmitting/receiving service. However, the present invention is not limited thereto.

At step S320, the controller 180 of the first mobile terminal 100 measures a reception strength of a first service network signal which it receives through the first service network. At step S330, the controller 180 determines whether the reception strength of the first service network signal is lower than a predetermined threshold value or not. At step S340, the controller 180 continuously provides the communication service through the first service network when the reception strength of the first service network signal is higher than the predetermined threshold value.

When the reception strength of the first service network signal is lower than the predetermined threshold value, the controller 180 switches the first service network to a second service network at steps S350 and S360. The second service network is a service network having a better communication state than the first service network. That is, a reception strength of a second service network signal is higher than the predetermined threshold. The controller 180 may switch the first service network to the second service network when the reception strength of the first service network signal is lower than the predetermined threshold for a predetermined time.

A process of switching a service network will be described in more detail. When the reception strength of the first service network signal is lower than the predetermined threshold, the controller 180 requests a service network of the second user-identification module to perform a communication service which is currently provided through the first service network at step S350.

When the second service network accepts the request of performing the communication service, the controller 180 provides the communication service through the second service network at step S360. At step S370, the mobile terminal 100 transmits necessary information to a call-receiving mobile terminal to display a message that the communication service is provided through the first communication network although the communication service is actually provided through the second service network.

The call-receiving mobile terminal may output an audio signal or a video signal to inform a user that the communication service is provided through the first communication network. That is, the second identification number of the second user-identification module is not revealed to the user although the communication service is provided using the second identification number. Therefore, a user of the mobile terminal 100 can prevent the personal information such as the second identification number from being revealed.

Figure 13:
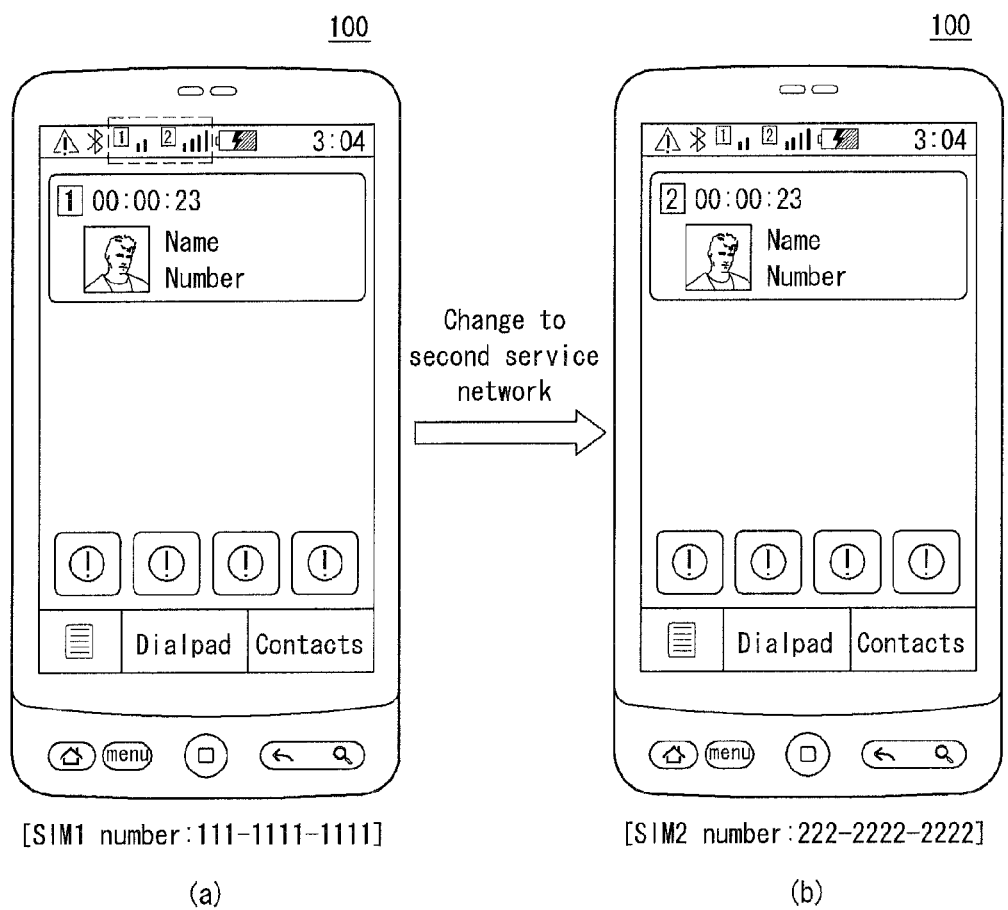
FIG. 13 illustrates a process of switching a service network used for transmitting a call based on a communication state of a service network according to the method for controlling a mobile terminal of FIG. 12.
Figure 14:
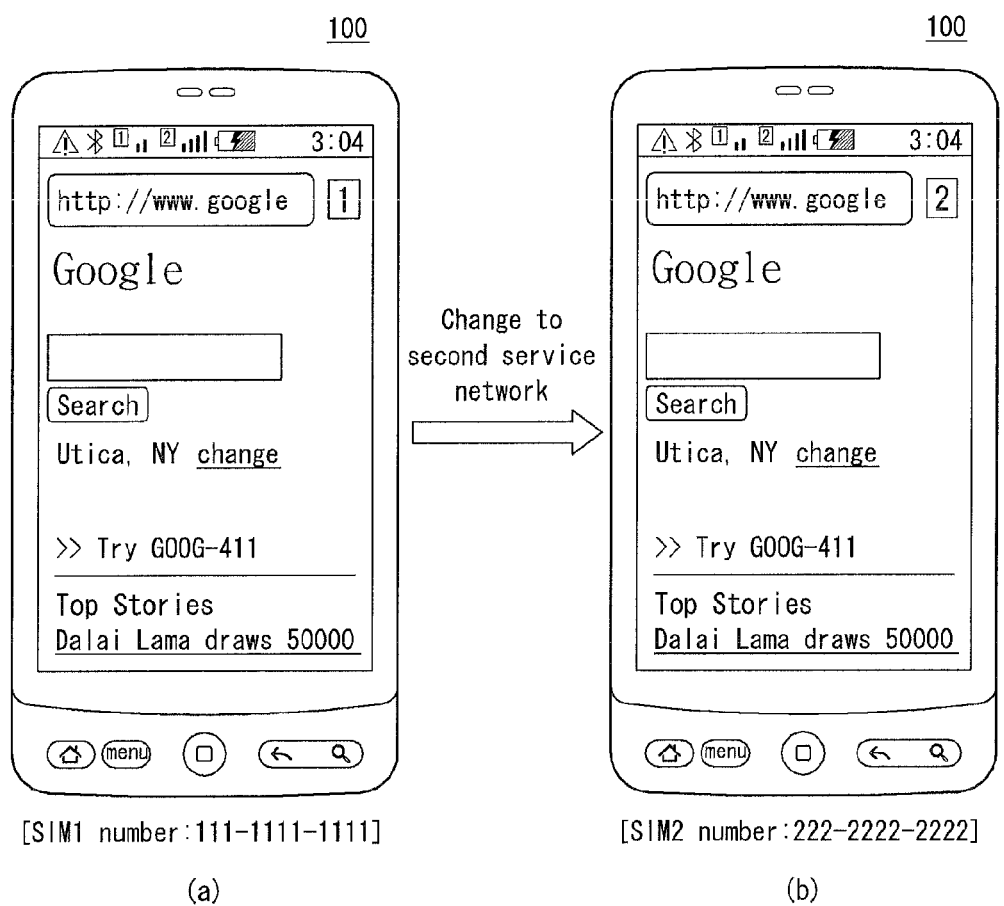
FIG. 14 illustrates a process for switching a service network used for web-browsing based on a communication state of a service network according to the method for controlling a mobile terminal of FIG. 12.
Figure 15:
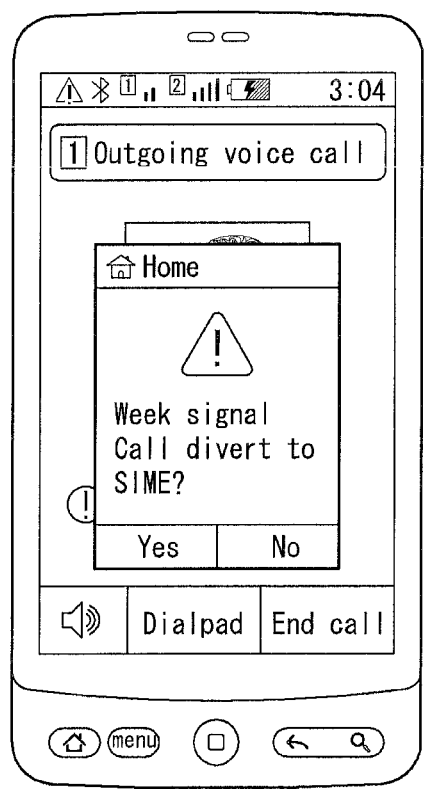
FIG. 15 illustrates a message window for inquiring a user to switch a service network having an improper communication state to a service network having a proper communication state according to the method for controlling a mobile terminal of FIG. 12.

FIG. 13 illustrates a process of switching a service network used for transmitting a call based on a communication state of a service network according to the method for controlling a mobile terminal of FIG. 12. Indicators surrounded by a dotted line show that the mobile terminal 100 includes first and second user-identification modules. Furthermore, the indicators show that a reception strength of a service network signal corresponding to the first user-identification module is lower than that of a service network signal corresponding to the second user-identification module. Same indictors are shown in FIGS. 13 to 15.

When the reception strength of the first service network signal is dropped below a predetermined threshold while providing a call service through the first service network corresponding to the first user-identification module as shown in a diagram (a) of FIG. 13, the controller 180 informs a user that the user can switch a current service network to a second service network corresponding to the second user-identification module, as shown in a diagram (b) of FIG. 13.

The controller 180 may output a warning sound, a voice message, and/or a video message through the output unit 150 in order to inform a user that the reception strength of the first service network signal is dropped below the predetermined threshold value. When the reception strength of the first service network signal is dropped below the predetermined threshold for a predetermined time, the controller 180 may output information through the output unit 150 in order to warn a user.

Furthermore, the controller 180 may output information through the output unit 150 that a service network providing a call service is switched from the first service network to the second service network. Referring to FIG. 13, the controller 180 may display information on a service network used for a current call service with a call recipient's name, telephone number, and call duration on a left side of an output unit 150.

Also, the controller 180 may transmit information to a call-receiving terminal in order to inform a user of the call-receiving terminal that a service network providing a call service has switched from the first service network to the second service network. Then, the call receiving terminal displays an identification number corresponding to the second service network based on the received information.

FIG. 14 illustrates a process for switching a service network used for web-browsing based on a communication state of a service network according to the method for controlling a mobile terminal of FIG. 12. When a reception strength of the first service network signal is dropped below a predetermined value while receiving a web-browsing service through a first service network corresponding to the first user-identification module as shown in a diagram (a) of FIG. 14, the controller 180 of the mobile terminal 100 informs a user that the user can switch the current service network to a second service network corresponding to the second user-identification module as shown in a diagram (b) of FIG. 14. The controller 180 may display information about a service network used for a web-browsing service on a right side of an address window.

FIG. 15 illustrates a message window for inquiring a user to switch a service network having an improper communication state to a service network having a proper communication state according to the method for controlling a mobile terminal of FIG. 12. When the reception strength of a signal transmitted from a first service network used for transmitting a call is lower than a predetermined threshold, the controller 180 may display a message window for inquiring a user to change the first service network to a second service network having a batter communication state. Although it is not shown in FIG. 15, the controller 180 may output a voice signal to inquire a user to change the service network.

As described above, the controller 180 of the mobile terminal 100 analyzes the communication state of the service network based on the reception strength of the service network signal and determines switching of a service network based on the analysis result. However, the communication state of the service network may be determined based on various criterions such as a signal to noise ratio (SNR) of a service network and an error rate of a service network signal.

For example, the controller 180 may change the current service network to another service network when a SNR of the current service network is dropped below a predetermined threshold or when an error rate of a service network signal is higher than a predetermined rate.

The above-described mobile terminal operation method in a server or the mobile terminal may be written as computer programs and may be implemented in digital microprocessors that execute the programs using a computer readable recording medium. The method of controlling the mobile terminal may be executed through software. The software may include code segments that perform required tasks. Programs or code segments may also be stored in a processor readable medium or may be transmitted according to a computer data signal combined with a carrier through a transmission medium or communication network.

The computer readable recording medium may be any data storage device that can store data that can be thereafter read by a computer system. Examples of the computer readable recording medium may include read-only memory (ROM), random-access memory (RAM), CD-ROMs, DVD±ROM, DVD-RAM, magnetic tapes, floppy disks, optical data storage devices. The computer readable recording medium may also be distributed over network coupled computer systems so that the computer readable code is stored and executed in a distribution fashion.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A mobile terminal comprising;
a first user identification module configured to be assigned with a first identification number and receive a service from a first service network;
a second user identification module configured to be assigned with a second identification number and receive a service from a second service network; and
a controller configured to receive a service request related to the first identification number from an opposing mobile terminal, to determine that the first user identification module is in an inactive state, to determine that the second user identification module is in an active state, to request the second service network to perform a predetermined service using the second identification number in response to receiving the service request and the determination that the first user identification module is in the inactive state and the second user identification module is in the active state, and to transmit information to the opposing mobile terminal to specifically indicate that the predetermined service is requested to the first service network using the first identification number although the controller has requested the predetermined service from the second service network using the second identification number.

2. The mobile terminal of claim 1, wherein the controller outputs info nation through an output unit to show the predetermined service is requested to the second service network using the second identification number although the predetermined service is originally requested using the first identification number.

3. The mobile terminal of claim 1, wherein the service request using the first identification number includes at least one of a call transmitting service, a message transmitting service, and a data transmitting/receiving service.

4. A mobile terminal comprising:
a first user identification module configured to be assigned with a first identification number and to receive a service from a first service network;
a second user identification module configured to be assigned with a second identification number and to receive a service from a second service network;
a communication unit configured to provide a communication service using one of the first user identification module and the second user identification module; and
a controller configured to receive a service request relating to the first identification number from an opposing mobile terminal, to determine a communication state of the first service network, to request the second service network to perform a predetermined service using the second communication number in response to receiving the service request and the determination that the communication state of the first service network is below a predetermined threshold, and to transmit information to the opposing mobile terminal to specifically indicate that the predetermined service is requested to the first service network using the first identification number although the controller requests the predetermined service from the second service network using the second identification number.

5. The mobile terminal of claim 4, wherein the communication state relates to at least one of signal reception strength of the first service network, signal to noise ratio (SNR) of the first service network, and signal error rate of the first service network.

6. The mobile terminal of claim 4, wherein the controller outputs information through an output unit to show that the first service network is switched to the second service network.

7. The mobile terminal of claim 4, wherein the controller transmits the information through the communication unit to the opposing mobile terminal to show that the first service network is switched to the second service network.

8. The mobile terminal of claim 4, wherein the controller outputs information through an output unit to show the communication state of the first service network.

9. The mobile terminal of claim 4, wherein the controller outputs at least one of a voice signal and a video signal to ask a user whether or not to change the first service network to the second service network.

10. The mobile terminal of claim 4, wherein the communication service includes at least one of a call transmitting/receiving service, a message transmitting/receiving service, and a data transmitting/receiving service.

* * * * *